G. A. PFLUEGER.
ADJUSTABLE BEARING.
APPLICATION FILED JUNE 18, 1914.

1,122,800.

Patented Dec. 29, 1914.

WITNESSES=
O. M. Kappler
Robert M. S...

INVENTOR
George A. Pflueger
BY Fay & Oberlin
ATTORNEYS

UNITED STATES PATENT OFFICE.

GEORGE A. PFLUEGER, OF AKRON, OHIO, ASSIGNOR TO THE ENTERPRISE MANUFACTURING COMPANY, OF AKRON, OHIO, A CORPORATION OF OHIO.

ADJUSTABLE BEARING.

1,122,800.  Specification of Letters Patent.  Patented Dec. 29, 1914.

Application filed June 18, 1914. Serial No. 845,772.

*To all whom it may concern:*

Be it known that I, GEORGE A. PFLUEGER, a citizen of the United States, and a resident of Akron, county of Summit, and State of Ohio, have invented a new and useful Improvement in Adjustable Bearings, of which the following is a specification, the principle of the invention being herein explained and the best mode in which I have contemplated applying that principle, so as to distinguish it from other inventions.

The present invention relates to bearings, and its particular object is the provision of an end or thrust bearing for rotatable shafts, which may be readily adjusted and which will be prevented from moving from its adjusted position.

Although the bearing may be incorporated in various mechanisms which include a rotating shaft, it is designed particularly for use in fishing reels. Fishing reels include two end plates supporting a spool and operating mechanism therefor, and the present invention provides end bearings of pleasing appearance which may readily be adjusted to center the spool, or to take up end play of the spool, or to produce a greater resistance to the rotation of the spool when desired.

The invention provides highly efficient means for retaining the bearing in adjusted position, and the complete device is one that may be economically manufactured and that easily assembled and adjusted.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
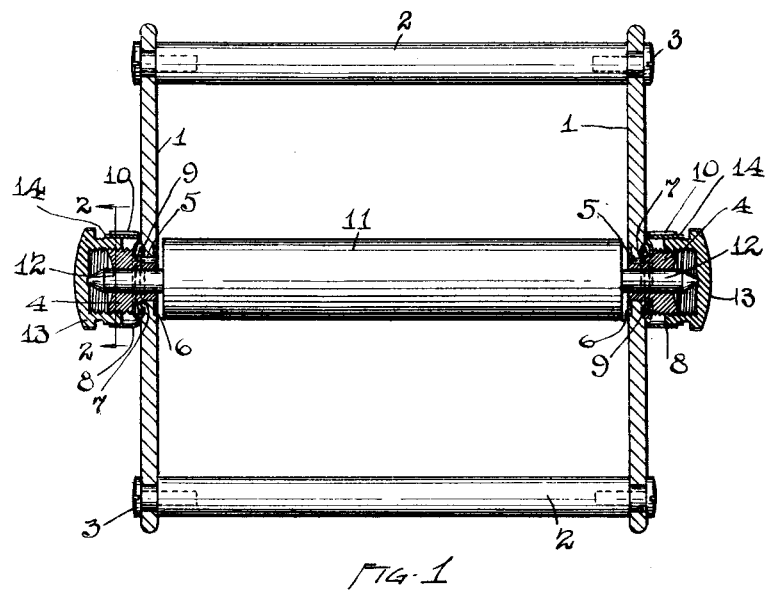
Figure 2:
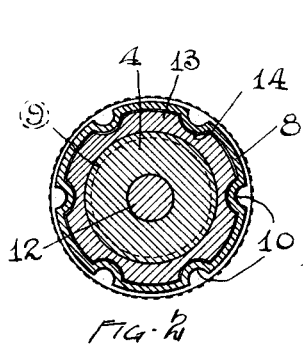

In said annexed drawing:—Figure 1 is a vertical section generally representing a fishing reel embodying the invention; Fig. 2 is a section on the line 2—2 in Fig. 1; and Fig. 3 is a broken section showing a modified form of the invention.

A fishing reel includes a frame in which is mounted a rotatable spool and various operative mechanisms therefor, but since this invention relates to adjustable bearings for a rotating shaft, it is only necessary to illustrate a frame supporting a shaft and its bearings.

The frame of a fishing reel comprises two end plates 1 which are held together in spaced relation by tubular members 2 to which the end plates are secured by screws 3. In accordance with the present invention a bearing 4 is rigidly secured to each end plate and it is preferably secured by providing it with a shank engaging a flute 5 in an opening in the end plate, and riveting the shank to the end plate with its head 6 burnished over flush with the inner surface of the plate. The bearing 4 is formed with a shoulder 7 facing the outer surface of the plate, and a cup-shaped member 8, preferably formed of thin sheet metal, is mounted on the shank of the bearing between the shoulder 7 and the end plate. A spring ring 9, which is preferably seated in a recess in the end plate, presses the base of the cup-shaped member 8 into frictional contact with the shoulder 7 and the wall of the cup-shaped member is formed with a plurality of longitudinally extending flutes 10.

Figure 3:
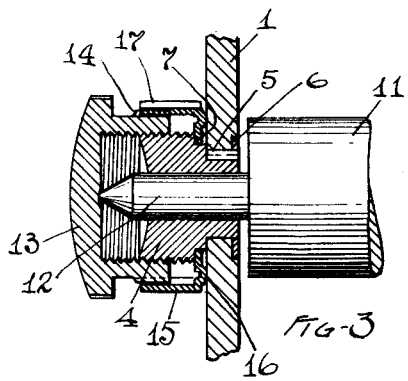

Fig. 3 illustrates a slightly different way of securing the frictional contact of the cup-shaped member with the shoulder on the bearing. In this instance a cup-shaped member 15 is provided with flutes 17, similar to flutes 10 on the member 8, but the spring 9 is dispensed with and the member 15 is formed in its base with a groove 16 which is of sufficient depth to bear against the end plate and resiliently force the base into frictional contact with the shoulder 7.

A shaft or spool 11 is mounted to rotate in the bearings 4 and its ends 12, which are preferably of reduced diameter, have their ends exposed. A cup-shaped end or thrust bearing cap 13 is interiorly threaded on exterior threads formed on the bearing 4 and the wall of the cap 13 is formed with a series of longitudinally extending flutes 14, which fit with some looseness within the flutes 10 on the member 8.

In manufacturing a fishing reel, the bearings 4 and friction members 8, and the springs 9 if they be used, will be secured permanently in position on the end plates. A user, possessing an assembled reel, may readily take up end play of the shaft or vary the resistance to its rotation by screwing the bearing caps 13 one way or the other on the bearings 4, as the case may be. If the shaft runs too loosely in the bearings 4 after long use of the reel, it may be centered by the inward adjustment of the bearing caps 13 which are provided centrally with conical depressions to receive the conical ends of the shaft.

The bearing caps 13 will always remain in any position to which they are adjusted because they are non-rotatively in engagement with the friction members 8 whose accidental rotation is effectively prevented by the frictional contact which is maintained under tension between the bases and the shoulder 7 on the bearings 4 and also between their bases and the end plate 1 and the spring 9, if the latter be employed. Nevertheless the bearing cap may be readily adjusted by the operator for by grasping the knurled head of the bearing cap he may easily screw it one way or the other on the bearing 4 and overcome the friction between the member 8 and the contacting surface, and there is no prevention of the longitudinal movement of the bearing cap, because the flutes on its exterior surface loosely engage the flutes on the member 8 so that the bearing cap may slide longitudinally relatively to the friction member.

It will readily be understood that the bearing provided by the present invention may be utilized in mounting other rotatable shafts than the spools of fishing reels, but it is designed especially for use in mounting such spools and it will probably be used most generally for that purpose.

The device which has been illustrated and described may also be used as an oil or grease cup with substantially no change. For instance, it may be assumed that in Fig. 1 it is desired to supply grease through a support, represented by one of the end plates 1. Under this assumption the end of the shaft 12 would not project through the member 4, and the opening through that member would be free for the passage of the lubricator. The lubricator may be placed inside of the cap 13 so that screwing the cap down on the member 4 would force the lubricator through the member 4, while the friction member 8 would prevent any unintentional movement of the cap 13.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a device of the class described, the combination of a shaft; a support therefor; a member threaded to the support and adapted to contact with the end of the shaft; and a second member secured against substantial longitudinal movement but rotatable with friction, and non-rotatably but slidably engaging the first member.

2. In a device of the class described, the combination of a support; a bearing fixedly secured thereto; a shaft journaled in the bearing; an end-bearing for the shaft threaded to the bearing; and a member secured against substantial longitudinal movement but rotatable with friction, and non-rotatably but slidably engaging the end-bearing.

3. In a device of the class described, the combination of a support; a bearing fixedly secured thereto and having a shoulder facing the support; a shaft journaled in the bearing; an end-bearing for the shaft threaded to the bearing; and a member rotatably and frictionally held between the shoulder and support, and non-rotatably but slidably engaging the end-bearing.

4. In a device of the class described, the combination of a support; a bearing fixedly secured thereto and having a shoulder facing the support; a shaft journaled in the bearing; an end-bearing for the shaft interiorly threaded on the bearing; and a cup-shaped member having its base rotatably and frictionally held between the shoulder and support, and having its wall rotatably but slidably engaging the exterior surface of the end-bearing.

5. In a device of the class described, the combination of a support; a bearing fixedly secured thereto and having a shoulder facing the support; a shaft journaled in the bearing; an end-bearing for the shaft interiorly threaded on the bearing and having longitudinal flutes on its exterior surface; and a cup-shaped member having its base rotatably and frictionally held between the shoulder and support, and having in its wall flutes engaging the flutes on the end-bearing.

6. In a device of the class described, the combination of a support; a bearing fixedly secured thereto and having a shoulder facing the support; a shaft journaled in the bearing; an end-bearing for the shaft interiorly threaded on the bearing and having longitudinal flutes on its exterior surface; and a cup-shaped member having its base rotatably held between the shoulder and support and spring-pressed against the shoulder, and having in its wall flutes engaging the flutes on the end-bearing.

7. In a device of the class described, the combination of a support; a bearing fixedly secured thereto and having a shoulder facing the support; a shaft journaled in the bearing; an end-bearing for the shaft interiorly threaded on the bearing and having longitudinal flutes on its exterior surface; a cup-shaped member having its base rotatably held between the shoulder and support, and having in its wall flutes engaging the flutes on the end-bearing; and a spring held between the support and member and pressing the base against the shoulder.

8. In a device of the class described, the combination of a plate; a bearing having a shank extending through and riveted to the plate, and having a shoulder facing the plate; a shaft journaled in the bearing; a cup-shaped end-bearing for the shaft interiorly threaded on the bearing and having longitudinal flutes on its exterior surface; and a cup-shaped member having its base rotatably held between the shoulder and plate and spring-pressed against the shoulder; and having in its wall flutes engaging the flutes on the end-bearing.

9. The combination of a support; a member fixedly secured thereto and having a shoulder facing the support, the member being provided with a central passage therethrough; a cup interiorly threaded on the member; and a cup-shaped member having its base rotatably and frictionally held between the shoulder and support, and having its wall rotatably but slidably engaging the exterior surface of the cup.

Signed by me, this 12th day of June 1914.

GEORGE A. PFLUEGER.

Attested by—
A. WEAVER,
GEORGE T. KEYS.

Copies of this patent may be obtained for five cents each, by addressing the " Commissioner of Patents, Washington, D. C."